United States Patent [19]
Zielinski et al.

[11] Patent Number: 5,410,407
[45] Date of Patent: Apr. 25, 1995

[54] LARGE APERTURE MIRROR TESTING APPARATUS AND METHOD

[75] Inventors: Robert J. Zielinski, Carlisle; Maurice Beaulieu, Methuen, both of Mass.

[73] Assignee: Litton Systems, Inc., Lexington, Mass.

[21] Appl. No.: 56,283

[22] Filed: Apr. 30, 1993

[51] Int. Cl.$^6$ .............................................. G01B 9/02
[52] U.S. Cl. ................................... 356/359; 356/357
[58] Field of Search ............... 356/359, 360, 376, 357

[56] References Cited

U.S. PATENT DOCUMENTS

| | | | |
|---|---|---|---|
| 1,824,668 | 9/1931 | Hasselkus et al. | 356/360 |
| 3,998,553 | 12/1976 | Hunter et al. | 356/109 |
| 4,211,486 | 7/1980 | Magnussen, Jr. et al. | 356/328 |
| 4,346,998 | 8/1982 | Franklin | 356/307 |
| 4,537,473 | 8/1985 | Maschmeyer | 350/432 |
| 4,636,074 | 1/1987 | Levy et al. | 356/328 |
| 4,676,597 | 6/1987 | Cisternino | 350/168 |
| 4,799,795 | 6/1989 | Fateley | 356/310 |
| 4,820,049 | 4/1989 | Biegen | 356/360 |
| 4,958,931 | 9/1990 | Tatian | 356/360 |
| 5,039,223 | 8/1991 | Gemma et al. | 356/348 |
| 5,080,490 | 1/1992 | Manhart | 356/351 |
| 5,155,554 | 10/1992 | Schnable | 356/359 |

FOREIGN PATENT DOCUMENTS

| | | |
|---|---|---|
| 3-188302 | 8/1991 | Japan . |
| 3-188302 | 8/1991 | Japan . |
| 523274 | 9/1976 | U.S.S.R. . |

*Primary Examiner*—Samuel A. Turner
*Attorney, Agent, or Firm*—Michael H. Wallach

[57] ABSTRACT

A combination of hindle shell and hindle sphere test bodies are employed to test optical surface quality or optical figure of a test optic having a convex hyperboloid reflective surface. A hindle sphere or array of hindle spheres is used to test an outer portion of the reflective surface. A subaperture hindle shell is used simultaneously with the hindle spheres to test the central portion of the reflective surface that is untested by the hindle spheres alone. The test optic may be coupled to a rotator to facilitate testing of the outer portion of the reflective surface where the hindle sphere is a segment of a full hindle sphere. A single hindle shell can test the reflective surface without the aid of a hindle sphere by employing a translator. The translator is used to de-center the test optic from the hindle shell. The translation results in non-null test results, which are analytically predictable and correctable by testing apparatus.

31 Claims, 11 Drawing Sheets

LARGE APERTURE MIRROR TESTING APPARATUS AND METHOD

BACKGROUND OF THE INVENTION

Convex hyperboloid mirrors are useful in many optical applications. These optical applications often require precision-ground mirrors in optical instruments. The slightest aberration on the reflective surface of the mirror may hinder the performance of the instrument or render the instrument useless. Thus, it is critical that the surface of a convex hyperboloid mirror be tested to ensure that optical surface quality or optical figure across the mirror surface is within close tolerances.

One apparatus used to test the optical surface quality of a mirror surface includes a hindle sphere reflector. In the classical hindle test of a convex hyperboloid, a wavefront of light passes through an aperture at the center of the hindle sphere to test the mirror surface. This aperture creates a "blind spot" in the test pattern corresponding to a central region of the mirror. In addition, the diameter of the hindle sphere must be substantially larger than that of the hyperboloid being tested.

An alternative to the hindle sphere test is the hindle shell test. A hindle shell is a lens having a concave and a convex surface. The convex surface is only used in transmission, but the concave surface is used in transmission and reflection. Because the hindle shell is used in transmission, material optical homogeneity must be very good. Both surfaces must also be optically polished. In addition, the diameter of the hindle shell must be greater than the diameter of the hyperboloid.

SUMMARY OF THE INVENTION

The hindle sphere and hindle shell tests become impractical as the size of the mirror surface of a test optic increases. The problem is most acute for convex hyperboloid mirror surfaces, which are frequently used as secondary mirrors in conjunction with concave primary mirrors in telescope configurations. The cost of a hindle shell becomes impractical as the hindle shell diameter increases beyond about one meter. With the need for larger secondary mirror optics for telescopes having an 8-meter or larger aperture, the test optics become even larger and become the major cost of development. Thus, a need exists for a reusable, relatively inexpensive testing apparatus for testing large aperture mirror surfaces.

Preferred embodiments of the invention relate to testing apparatus and methods for testing optical surface quality or optical figure of large aperture mirror surfaces. The testing apparatus is reusable and relatively inexpensive. Preferred embodiments of the testing apparatus permit reuse with large aperture mirror surfaces having various diameters. In particular, preferred embodiments of the invention are described with respect to test optics having convex hyperboloid mirror surfaces.

In a preferred embodiment of the invention, an apparatus tests the optical surface contour or sphericity of a test optic having a mirror surface. Preferably, the test optic has a convex hyperboloid reflective mirror surface. The mirror surface has a primary and a secondary conjugate focus. The secondary conjugate focus is a center of curvature of the mirror surface. The mirror surface is a first focal length away from the primary conjugate focus and a second focal length away from the secondary conjugate focus. The mirror surface extends a predetermined arc measure with respect to the secondary conjugate focus.

A preferred embodiment of the invention comprises two types of test bodies. The test bodies are ground to a known sphericity. The test bodies provide a reference sphericity for comparison with the test optic.

A first test body is a partially reflective lens having a transmissive surface and a concave partially-reflective surface of known sphericity. The concave partially-reflective surface has a center of curvature which is positioned coincident with the secondary conjugate focus of a test optic (i.e., mirror under test). The concave partially-reflective surface has a radius of curvature as measured from the center of curvature that is greater than the second focal length of the mirror surface, and an arc measure as measured from the center of curvature that is less than the arc measure of the mirror surface. Light originating from a focal point of the lens becomes incident on the transmissive surface of the first test body and is transmitted through the first test body such that the light appears to originate from the first conjugate focal point. The light is then retroreflected back from the mirror surface to the focal point of the first test body. In particular, the first test body may comprise a hindle shell optical lens.

A light source and an interferometer are optically positioned at the focal point of the first test body. The light source generates a wavefront of light, which expands toward the first test body. The wavefront of light is centered about an optical axis extending from the focal point of the first test body to the center of curvature of the first test body. An interferometer measures interference patterns between light generated by the light source and light that is retroreflected from the reflective surface of the test optic. These patterns are used to indicate aberrations on the mirror surface of the test optic.

A second test body has a concave reflective (or mirror) surface of known sphericity. The concave reflective surface is a section of a spherical reflector that has a center of curvature that is positioned coincident with the secondary conjugate focus of the mirror surface of the test optic. The concave reflective surface has a radius of curvature as measured from the center of curvature that is greater than the second focal length of the mirror surface. The concave reflective surface extends an arc measure with respect to the secondary conjugate focus. The second test body further comprises an annular aperture of another arc measure through which the wavefront of light passes. In particular, the second test body may comprise a hindle sphere optical reflector.

In a variation of the above preferred embodiment, the second test body may be a segmented hindle sphere. With a segmented hindle sphere, only a portion of the outer surface of the mirror surface is tested. In a particular preferred embodiment of the invention, the hindle sphere segment is a circular section of a full hindle sphere. More particularly, the segment extends such that one-eighth of the outer surface of the mirror surface is tested by the segment. Thus, only one-eighth of the outer mirror surface is tested. To test the remaining untested outer portion of the mirror surface, the apparatus further includes a rotator to rotate the test optic about the optical axis, as defined above. By incrementally rotating the test optic relative to the test bodies, the entire outer surface of the mirror surface is tested by the segmented hindle sphere.

In another variant embodiment of the above preferred embodiment, the second test body comprises an array of hindle spheres arranged to extend for an arc measure from the arc measure extent of the first test body to the arc measure extent of the mirror surface. The radius of curvature of each hindle sphere in the array may vary, with the center of curvature of each hindle sphere coincident with the secondary conjugate focus.

In another embodiment of the invention, a single type of test body is used. The single test body is of the type of the first test body described above (i.e., a hindle shell). The test body has a radius of curvature greater than the second focal length of the mirror surface of the test optic and extends less than the arc measure extent of the mirror surface. The test body is positioned within the path of the wavefront of light. The center of curvature of the test body is coincident with the secondary conjugate focus of the mirror surface. The apparatus further includes a translator to translate the test optic about the secondary conjugate focus of the mirror surface. The translation of the mirror surface relative to the test body permits the test body to test an outer portion of the mirror surface. Similarly, translation can be used in the dual test body embodiment so the hindle sphere (or section thereof) can test the outer portion of the mirror surface.

The rotation or translation of the test optic may cause non-null test results. The non-null test results may be corrected within the interferometer by software instructions. The non-null test results may alternatively be corrected using corrective optics.

BRIEF DESCRIPTION OF DRAWINGS

The above and other features of the invention including various novel details of construction and combinations of parts will now be more particularly described with reference to the accompanying drawings and pointed out in the claims. It will be understood that the particular testing apparatus embodying the invention is shown by way of illustration only and not as a limitation of the invention. The principles and features of this invention may be employed in varied and numerous embodiments without departing from the scope of the invention.

DETAILED DESCRIPTION OF PREFERRED EMBODIMENTS OF THE INVENTION

Figure 1:
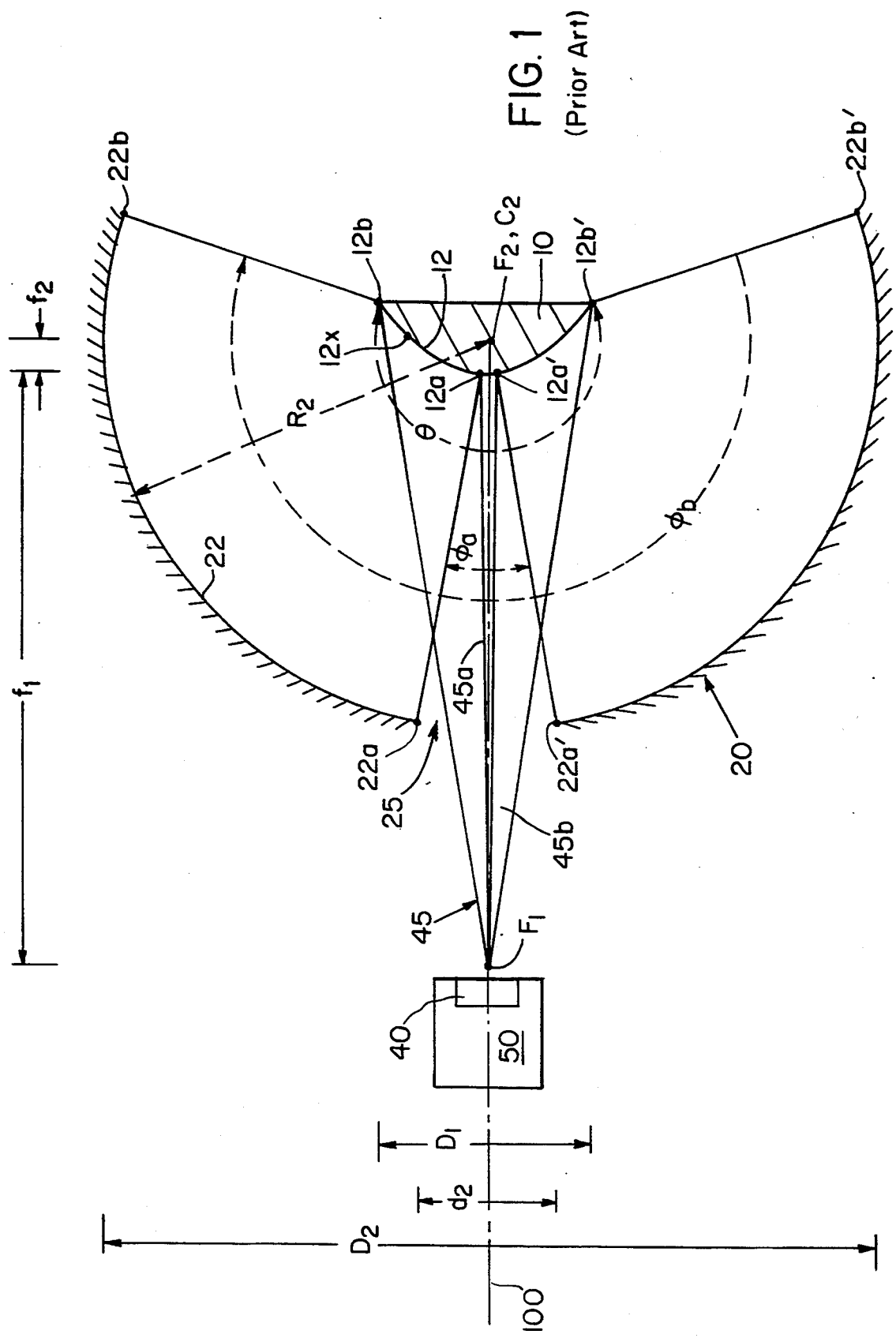
FIG. 1 is a cross-sectional schematic diagram illustrating prior art use of a hindle sphere.

FIG. 1 is a cross-sectional schematic diagram of a prior art apparatus used for performing the classical hindle test upon a test optic 10 having a convex hyperboloid reflective surface 12. The hyperboloid mirror surface 12 has a primary conjugate focus $F_1$ located a distance $f_1$ from the reflective side of the mirror surface 12 and a secondary conjugate focus $F_2$ located a distance $f_2$ from the backside of the mirror surface 12. The distance $f_2$ from the secondary conjugate focus $F_2$ can be considered to be the radius of curvature if the reflective surface 12 is spherical, although that distance $f_2$ is not constant along an aspherical reflective surface 12. The mirror surface 12 has a predetermined aperture of diameter $D_1$ and arc measure $\theta$.

A hindle sphere 20 is placed such that its center of curvature $C_2$ coincides with the secondary focus $F_2$. The alignment may be accomplished by using an interferometer positioned at the secondary focus $F_2$ to locate the hindle sphere center of curvature $C_2$. As may be seen in the drawing of FIG. 1, the arc measure $\phi_b$ of the hindle sphere 20 must extend at least as far as the arc measure $\theta$ of the mirror surface 12. Furthermore, the diameter $D_2$ of the concave surface 22 of the hindle sphere 20 must be substantially larger than the diameter $D_1$ of the test optic 10. The hindle sphere 20 has an opening or aperture 25 of sufficient diameter $d_2$ and arc measure $\phi_a$ to provide a line-of-sight from the primary focus $F_1$ to the peripheral edge of the mirror surface 12.

In the classical hindle test, a light source 40 and an interferometer 50 are positioned at the primary focus $F_1$. A wavefront of light 45 expands from the light source 40 located at primary focus $F_1$ toward the test optic 10 and is centered along the optical axis 100. The wavefront of light 45 passes through the aperture 25 in the hindle sphere 20. Light rays incident on the mirror surface 12 are reflected. Light rays reflected from the reflective system 12 may become incident on the reflective surface 22 of the hindle sphere 20. If the reflective surface 12 is perfectly contoured, then the reflected light rays will be incident normal to the reflective surface 22 of the hindle sphere 20. The normal incident light rays are reflected by the reflective surface 22 of the hindle sphere 20 so the path of the light rays are reversed. The reversed optical path includes retroreflection from the mirror surface 12 back to the primary focus $F_1$.

The interferometer 50 located at the primary focus $F_1$ measures interference patterns between source light from the light source 40 and light retroreflected from the mirror surface 12. If the mirror surface 12 is perfectly ground, then the retroreflected light will be identical to the source light. In the perfect case, the interference fringe patterns will be straight and parallel relative to each other. If there are aberrations on the mirror surface 12, then the retroreflected light will differ from the source light. These differences are measured by the interferometer as distorted interference fringe patterns.

The classical hindle test is unable to test the entire mirror surface 12 because of the extent of aperture 25. To be tested, light rays must be reflected by the hindle sphere 20 back to the mirror surface 12. Light rays reflected by the mirror surface 12 that pass through the aperture 25 escape testing. The light rays must be reflected within the boundary of the hindle sphere 20 defined by the inner aperture edge 22a, 22a' and the periphery edge 22b, 22b'. These points correspond to reflections from the reflective surface 12 of a perfect test optic 10 at respective points 12a, 12a' and 12b, 12b'. Thus, the area of the mirror surface 12 between the inner points 12a, 12a' cannot be tested by the classical hindle test. The untested area extends an arc measure equal to the arc measure $\phi_a$ of the aperture 25.

The untested area corresponds to an inner band of light 45a. An outer band of light 45b is incident between the inner test points 12a, 12a' and the outer test points 12b, 12b'. Hence, only the outer band of light 45b is used in testing. To test the entire outer portion of the mirror surface 12, the hindle sphere 20 must be large enough so the outer test points 12b, 12b' are coincident with the periphery of the mirror surface 12.

Figure 2:
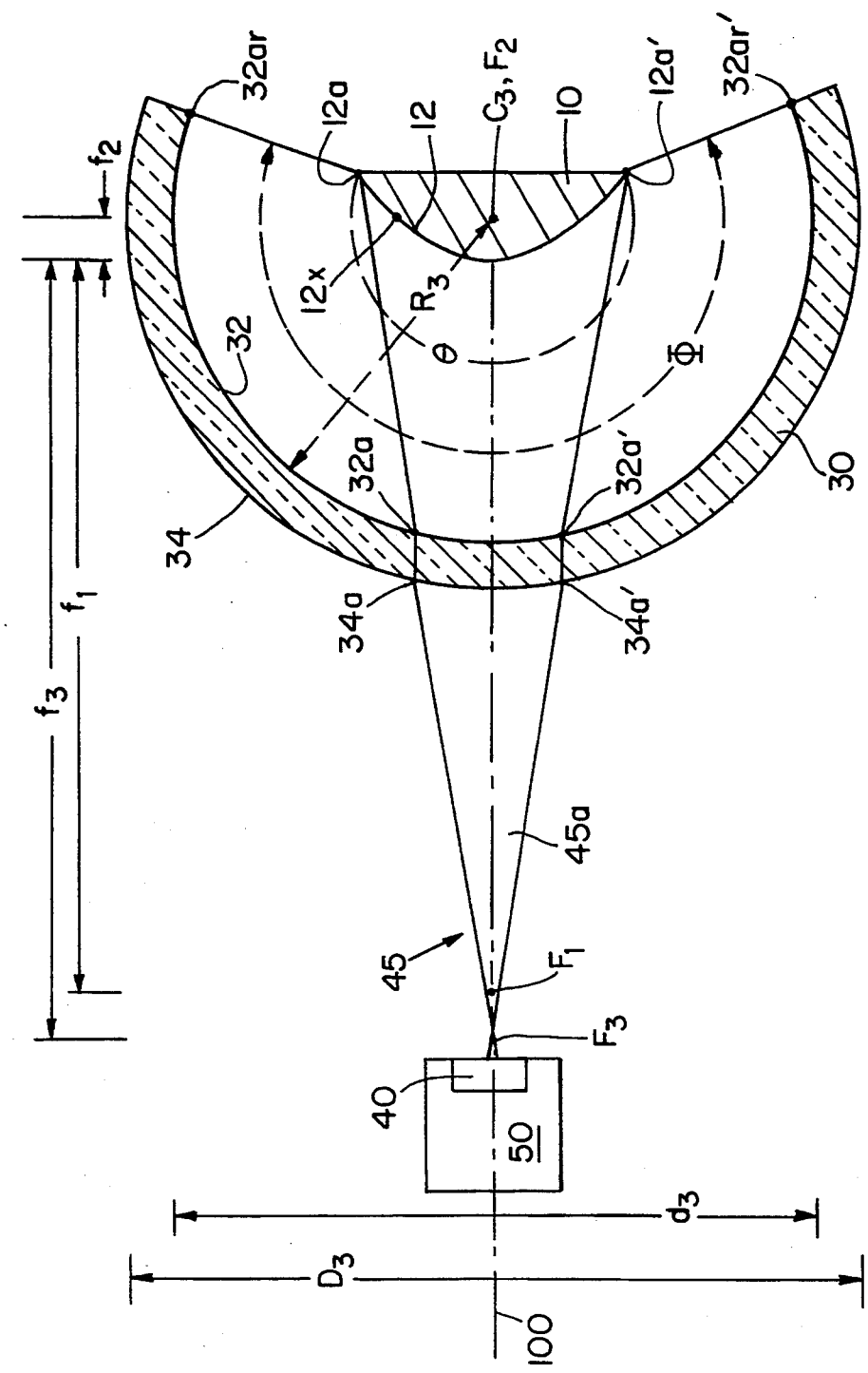
FIG. 2 is a cross-sectional schematic diagram illustrating prior art use of a hindle shell.

FIG. 2 is a cross-sectional schematic diagram of a prior art apparatus used for performing the hindle shell test. The hindle shell 30 is both light transmissive and light reflective. The convex surface 34 is transmissive to light. The concave surface 32 has a coating that is partially reflective and partially transmissive to light. The coating may also be partially absorptive, although a dielectric coating can be used to prevent light absorption. The concave surface 32 extends an arc measure $\Phi$ equal to the arc measure $\theta$ of the mirror surface 12. The diameter $D_3$ of the convex surface 34 is greater than the diameter $d_3$ of the concave surface 32. The convex surface 34 is typically spherical, but may be aspherical. However, a spherical convex surface 34 is easier to fabricate and has simpler optics. The hindle shell 30 is positioned such that the center of curvature $C_3$ of the concave surface 32 is coincident with the secondary focus $F_2$ of the mirror surface 12. The hindle shell 30 is a lens having a lens focal point $F_3$ on the convex surface 34 side of the hindle shell 30. The focal point $F_3$ for the hindle shell 30 may differ from the primary focus $F_1$ of the mirror surface 12.

A wavefront of a light 45 from the lens focal point $F_3$ of the hindle shell 30 incident on the transmissive surface 34 of the hindle shell 30 is transmitted through the body of the hindle shell 30, where the light rays are refracted by the lens. The refracted light rays appear to originate from the primary focus $F_1$ of the mirror surface 12, instead of from the lens focal point $F_3$. The refracted light rays continue to expand or diverge from the hindle shell 30 toward the test optic 10. The refracted light rays within a testing band 45a are incident on the mirror surface 12. The light rays are reflected from the mirror surface 12 to the concave surface 32 of the hindle shell 30.

If an arbitrary test point 12x of the mirror surface 12 represents a perfect hyperboloid, then the reflected light ray will travel radially relative to the secondary focus $F_2$ and toward the hindle shell 30, where the light ray will be incident normal to the concave surface 32. The reflected light rays that are incident normal to the partially-reflective concave spherical surface 32 of the hindle shell 30 are retro-reflected back in a reverse optical path to the focal point $F_3$ of the hindle shell 30. The reversed path includes retroflection from the mirror surface 12 at the arbitrary test point 12x.

If the arbitrary test point 12x of the mirror surface 12 varies from a perfect hyperboloid, then a light ray incident on the arbitrary test point 12x is reflected in non-radial path and thus are not incident normal to the partially-reflective surface 32. The non-radial path may or may not intersect, and thus be reflected by, the concave surface 32 of the hindle shell 30. In either case, the light ray cannot be reflected by the hindle shell 30 in a reverse optical path. Thus, aberrations on the reflective surface of the mirror surface 12 result in deformed patterns or gaps in the interference fringe pattern.

Because the hindle shell 30 lacks an opening or aperture and the entire concave surface 32 is at least partially reflective to incident light, the hindle shell 30 permits testing of the entire mirror surface 12. However, to enable testing of the entire mirror surface 12, the hindle shell 30 must be large enough so that light rays reflected from the edge 12a, 12a' of a perfect hyperboloid mirror surface 12 are reflected by the hindle shell 30 at respective reflection points 32ar, 32ar'. That is, the relationship $\Phi \geq \theta$ must be satisfied.

Figure 3A:
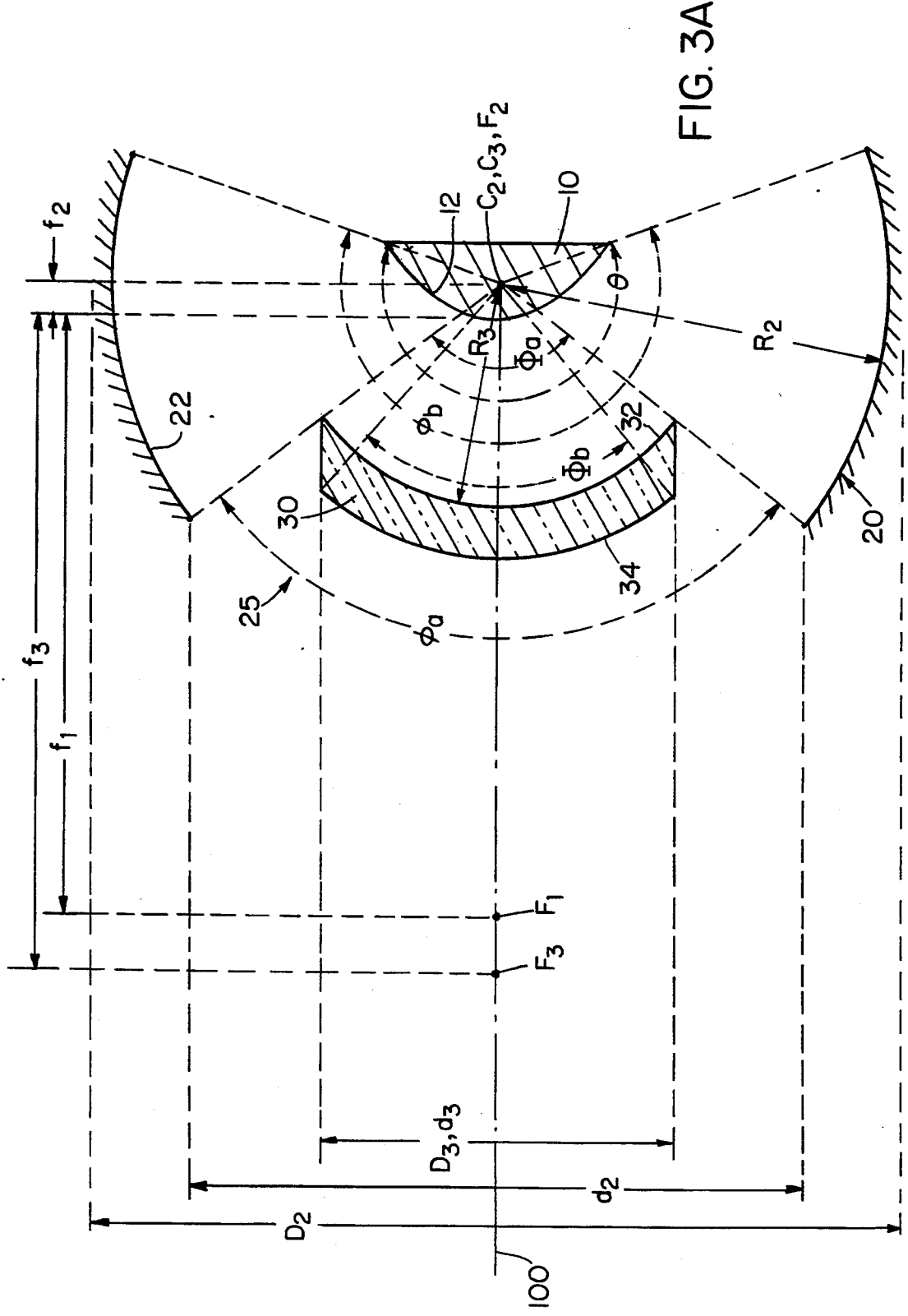
FIGS. 3A-B are cross-sectional schematic diagram of a preferred embodiment of the invention employing two types of test bodies.
Figure 3B:
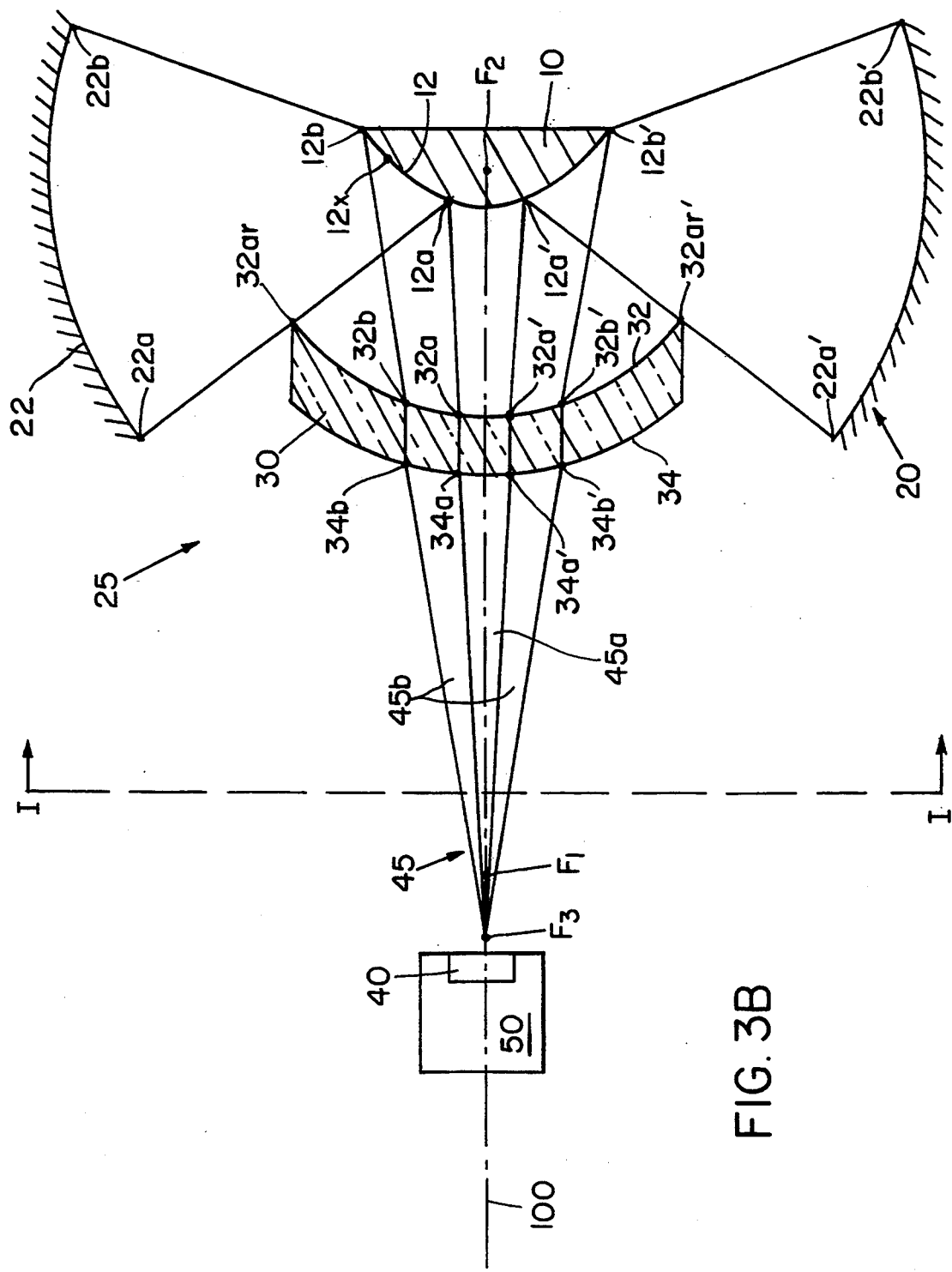

FIGS. 3A-B are cross-sectional schematic diagrams of a preferred embodiment of the invention. FIG. 3A illustrates the optical components of a preferred embodiment of the invention. A hindle sphere 20 and a hindle shell 30 are positioned around a reflective test optic 10. The reflective surface 12 of the test optic 10 is dimensioned as described above. The hindle shell 30 has an outer diameter $D_3$, which can vary from the inner diameter $d_3$. As illustrated, the outer diameter $D_3$ equals the inner diameter $d_3$. The inner surface 32 of the hindle shell 30 extends a fixed arc measure $\Phi_a$ relative to the secondary focus $F_2$ of the mirror surface 12. The arc measure $\Phi_b$ of the outer surface 34 of the hindle shell 30 cannot exceed the arc measure $\Phi_a$ of the inner surface 32 of the hindle shell 30.

A hindle sphere 20 has a maximum diameter $D_2$ and extends an arc measure $\phi_b$ at least from the arc measure $\Phi_a$ of the hindle shell 30 to the arc measure $\theta$ of the mirror surface 12. The aperture 25 has an arc measure $\phi_a$ extending no more than the arc measure $\Phi_a$ of the hindle shell 30. Although the diameter $d_2$ of the aperture 25 is illustrated as being greater than the diameters $D_3$, $d_3$ of the hindle shell 30, that is not required.

As illustrated in FIG. 3B, a preferred embodiment comprises a test optic 10 having a hyperboloid reflective surface 12, a hindle sphere 20, a subaperture hindle shell 30, a light source 40, and an interferometer 50. An optical axis 100 extends radially through the focal point $F_3$ of the hindle shell 30. The light source 40 and interferometer 50 are optically positioned at the lens focal point $F_3$ of the hindle shell 30. The light source 40 is preferably a perfect point light source. The mirror surface 12, the hindle sphere 20, and the hindle shell 30 are positioned coaxially about the optical axis 100. In addition, the centers of curvature $C_2$, $C_3$ of the hindle sphere 20 and the hindle shell 30 are coincident with the secondary focus $F_2$ of the mirror surface 12.

In a preferred embodiment of the invention, the combination of the hindle sphere 20 and the hindle shell 30 provides a known sphericity for complete testing of the mirror surface 12. The hindle shell 30 is a first test body for testing an inner area of the mirror surface 12, which is bounded by inner mirror test points 12a, 12a'. The hindle sphere 20 is a second test body for testing an outer portion of the mirror surface 12, which is bounded by the inner mirror test points 12a, 12a' and the outer mirror surface test points 12b, 12b'. Preferably, the outer test points 12b, 12b' are coincident with the peripheral edge of the mirror surface 12.

The apparatus of the invention is used to test the surface contour of the mirror surface 12 for aberrations. The light source 40 generates an expanding wavefront of light 45 that is centered about the optical axis 100 and directed toward the hindle shell 30 from the lens focal point $F_3$ of the hindle shell 30. The wavefront of light 45 can be viewed as two concentric bands of light 45a, 45b. The inner band of light 45a tests the inner portion of the mirror surface 12 using the hindle shell 30, and the outer band of light 45b tests the outer portion of the mirror surface 12 using the hindle sphere 20. The operation of each band of light 45a, 45b will now be discussed in turn.

The inner band of light 45a expands from the lens focal point $F_3$ of the hindle shell 30 to the transmissive surface 34 of the hindle shell 30. The inner band of light 45a enters the hindle shell 30 inside of the inner entry points 34a, 34a'. Within the body of the hindle shell 30, light rays within the inner band of light 45a are refracted and exit between respective inner exit points 32a, 32a' on the partially reflective surface 32 of the hindle shell 30.

After exiting the hindle shell 30, the inner band of light 45a becomes incident on the mirror surface 12 inside of the inner test points 12a, 12a'. The mirror surface 12 reflects light rays within the inner band of light 45a toward the partially reflective surface 32 of the hindle shell 30. As previously mentioned, the partially-reflective surface 32 of the hindle shell 30 reflects incident light rays back toward the mirror surface 12.

If the inner portion of the mirror surface 12 forms a perfect hyperboloid, then the light rays within the inner band of light 45a are reflected radially, as measured from the secondary focus $F_2$, to the reflective surface 32 of the hindle shell 30. The size of the inner portion of the mirror surface 12 is determined by the arc measure $\Phi_a$ of the reflective surface 32 of the hindle shell 30 with respect to the secondary focus $F_2$. A light ray that is incident on the mirror surface 12 just inside the inner test points 12a, 12a' is reflected by the edges 32ar, 32ar' of the reflective surface 32 of the hindle shell 30.

Light rays that are incident normal to the reflective surface 32 of the hindle shell 30 are reflected radially back toward the mirror surface 12 such that the optical path of the light rays is reversed. The light rays reflected by the hindle shell become incident normal to, and are thereby retroreflected by the mirror surface 12. The retroreflected light rays enter the hindle shell 30 at the reflective surface 32. The hindle shell 30 refracts the retroreflected light rays, which exit at the transmissive surface 34. The light rays are then focused by the hindle shell 30 on the lens focal point $F_3$ of the hindle shell 30.

The operation of the outer band of light 45b is similar to that of the inner band of light 45a, except that a hindle sphere 20 is used for reflection in place of the hindle shell 30. Light rays within the outer band of light 45b enter the hindle shell 30 on the transmissive surface 34 outside of the inner entry points 34a, 34a'. The outer band of light 45b extends along the transmissive surface 34 on the hindle shell 30 to the outer entry points 34b, 34b'. The light rays within outer band of light 45b are refracted by the hindle shell 30 such that light rays entering at the inner entry points 34a, 34a' exit at the inner exit points 32a, 32a' and light rays entering at the outer entry points 34b, 34b' exit at the outer exit points 32b, 32b'.

After exiting the hindle shell, the light rays within the outer band of light 45b become incident on the mirror surface 12 between the inner test points 12a, 12a' and the outer test points 12b, 12b'. The mirror surface 12 reflects the light rays within the outer band of light 45b toward the test bodies 20, 30. If the mirror surface 12 is a perfect hyperboloid, then the light rays within the outer band of light 45b are reflected radially as measured from the secondary focus $F_2$. The light rays within the outer band of light 45b are thus reflected radially toward the hindle sphere 20.

Light rays from the outer band of light 45b traveling radially from the mirror surface 12 become incident normal to the reflective surface 22 of the hindle sphere 20. A light ray incident at a point just outside the inner test points 12a, 12a' becomes incident at inner reflection points 22a, 22a' of the hindle sphere 20. Likewise, a light ray incident on the outer test points 12b, 12b' becomes incident at the outer reflective points 12b, 12b' of the hindle sphere 20.

If the mirror surface 12 is a perfect hyperboloid, the light rays within the outer band of light 45b are incident normal to the reflective surface 22 of the hindle sphere 20. The reflective surface 22 of the hindle sphere 20, therefore, reflects the outer band of light 45b so the optical path is reversed. The light rays are retroreflected by the mirror surface 12 through the hindle shell 30, which focuses the light rays within the outer band of light 45b on the lens focal point $F_3$ of the hindle shell 30.

An interferometer 50 positioned at the lens focal point $F_3$ of the hindle shell 30 analyzes the returning bands of light 45a, 45b. The interferometer 50 detects aberrations in the contour of the mirror surface 12 by analyzing interference patterns between the returning light and the source light. The interferometer further compensates for known aberrations on the test bodies 20, 30.

As illustrated in FIG. 3, the arc measures $\Phi$, $\phi$ of the test bodies 20, 30 can be determined by viewing the mirror surface 12 radially from the secondary conjugate focus $F_2$ (and thus the centers of curvature $C_2$, $C_3$ of the hindle sphere 20 and the hindle shell 30). The size of the inner test area, and thus the inner test points 12a, 12a' is determined by the arc measure $\Phi_a$ of the reflective surface 32 of the hindle shell 30. The reflective surface 32 of the hindle shell 30 must extend the entire arc measure $\Phi_a$ of the hindle shell 30. The arc measure $\phi_b$ of the hindle sphere 20 must extend from the inner test point 12a, 12a' to the outer test points 12b, 12b'. Although not illustrated, the arc measure $\phi_b$ of the hindle sphere 20 may extend beyond that of the inner or outer test regions of the mirror surface 12. The aperture 25 of the hindle sphere 20 must be large enough for the wavefront of light 45, in particular the inner band 45a and the outer band 45b to pass through.

Figure 4:
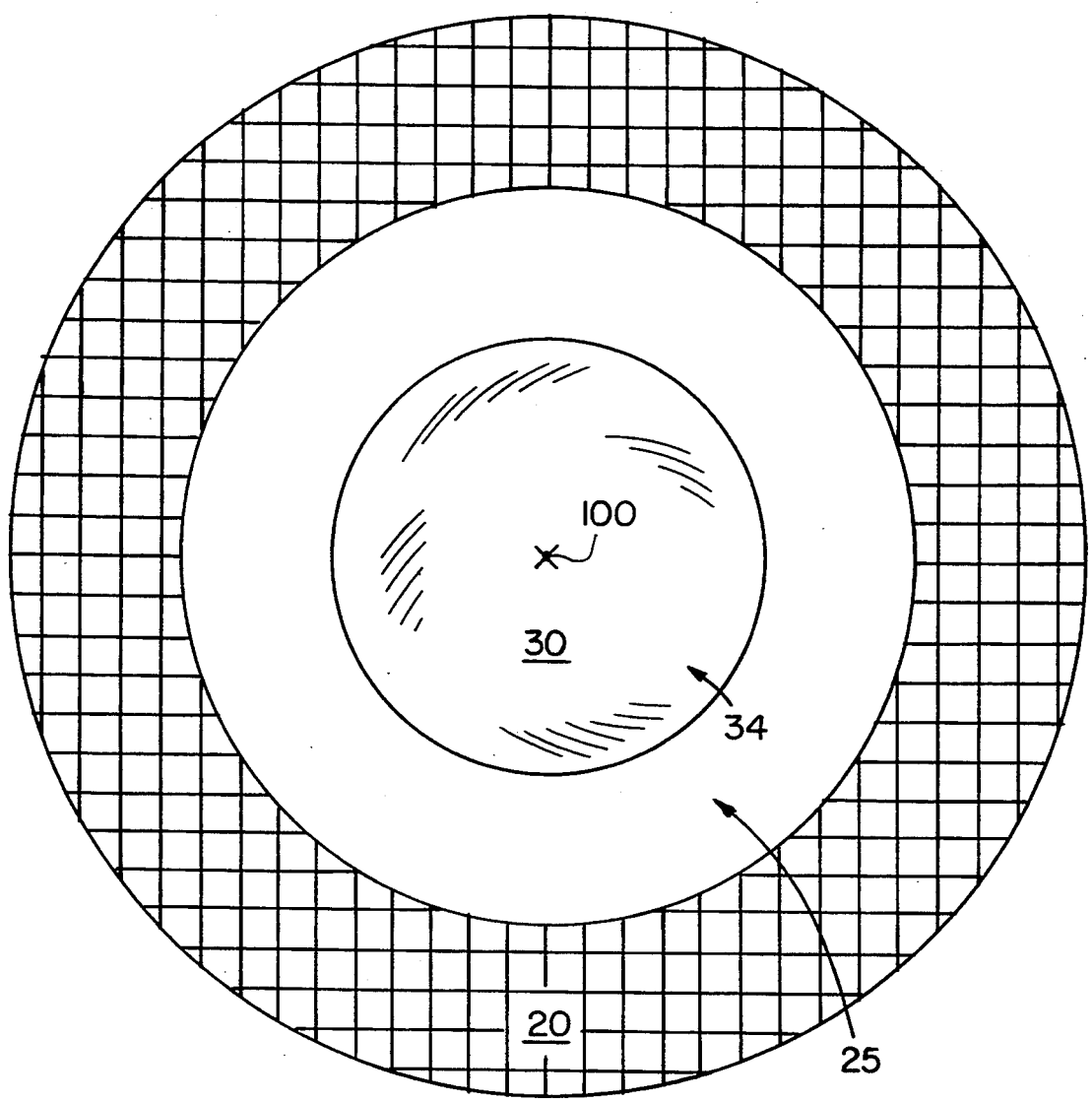
FIG. 4 is a view of a preferred embodiment taken along line I—I of FIG. 3B.

FIG. 4 is a view of the preferred embodiment of FIG. 3B along line I—I. The hindle sphere 20 and the hindle shell 30 are shown coaxial about the optical axis 100. Furthermore, the hindle shell 30 is positioned inside of the aperture 25 of the hindle sphere 20. As noted with regard to FIG. 3B, the size of the hindle sphere 20 may be larger than illustrated.

Figure 5:
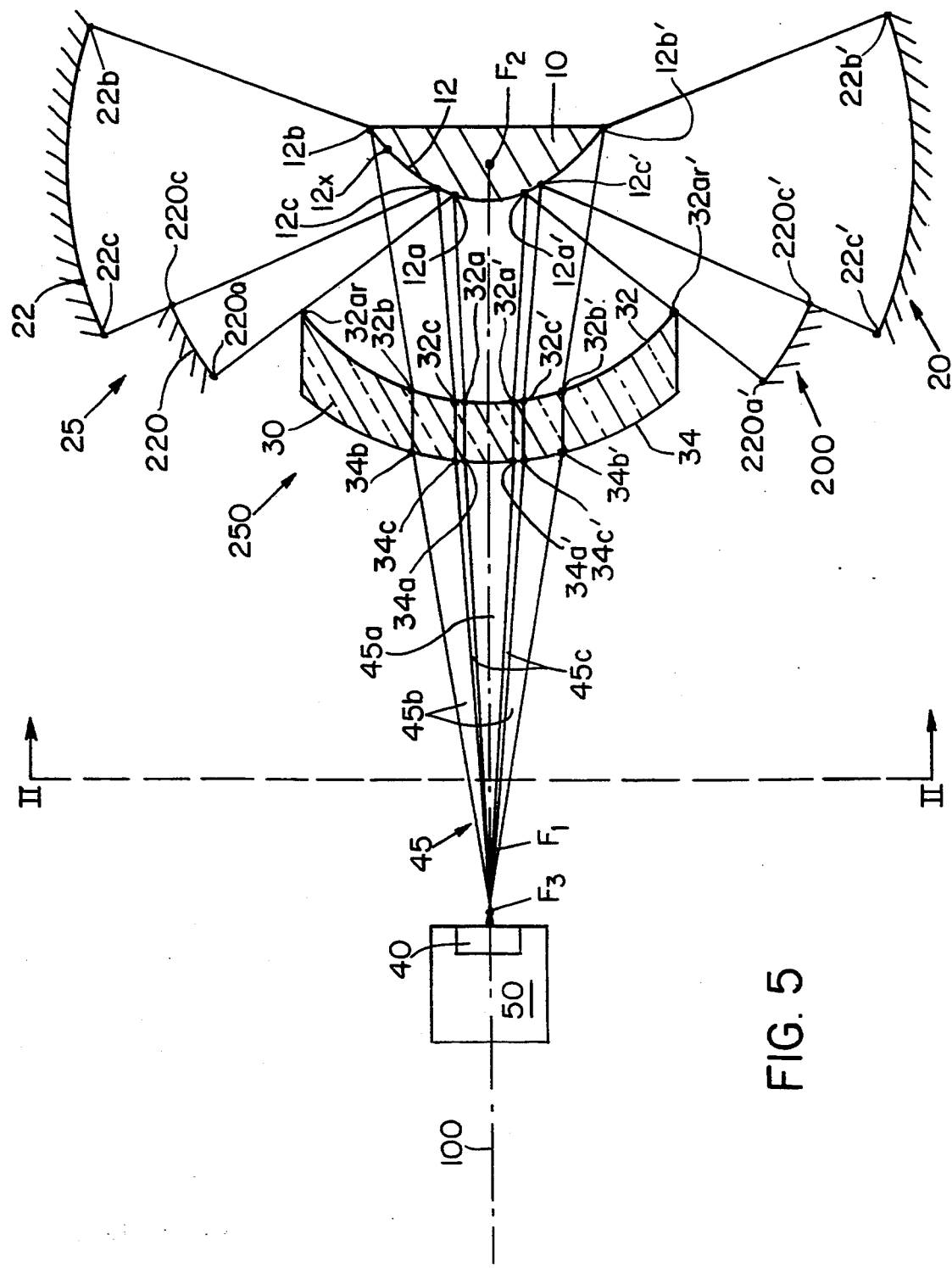
FIG. 5 is a cross-sectional schematic diagram of a preferred embodiment of the invention employing arrayed hindle spheres.

FIG. 5 is a cross-sectional schematic diagram of a preferred embodiment of the invention comprising an array of hindle spheres. An inner portion of the mirror surface 12 is tested by an inner band of light 45a using the hindle shell 30. A middle portion of the mirror surface 12 is tested by a middle band of light 45c and an inner hindle sphere 200. An outer portion of the mirror surface 12 is tested by an outer band of light 45b and an outer hindle sphere 20. Although the outer hindle sphere 20 is shown having a larger radius than the inner hindle sphere 200, that is not required.

Figure 6:
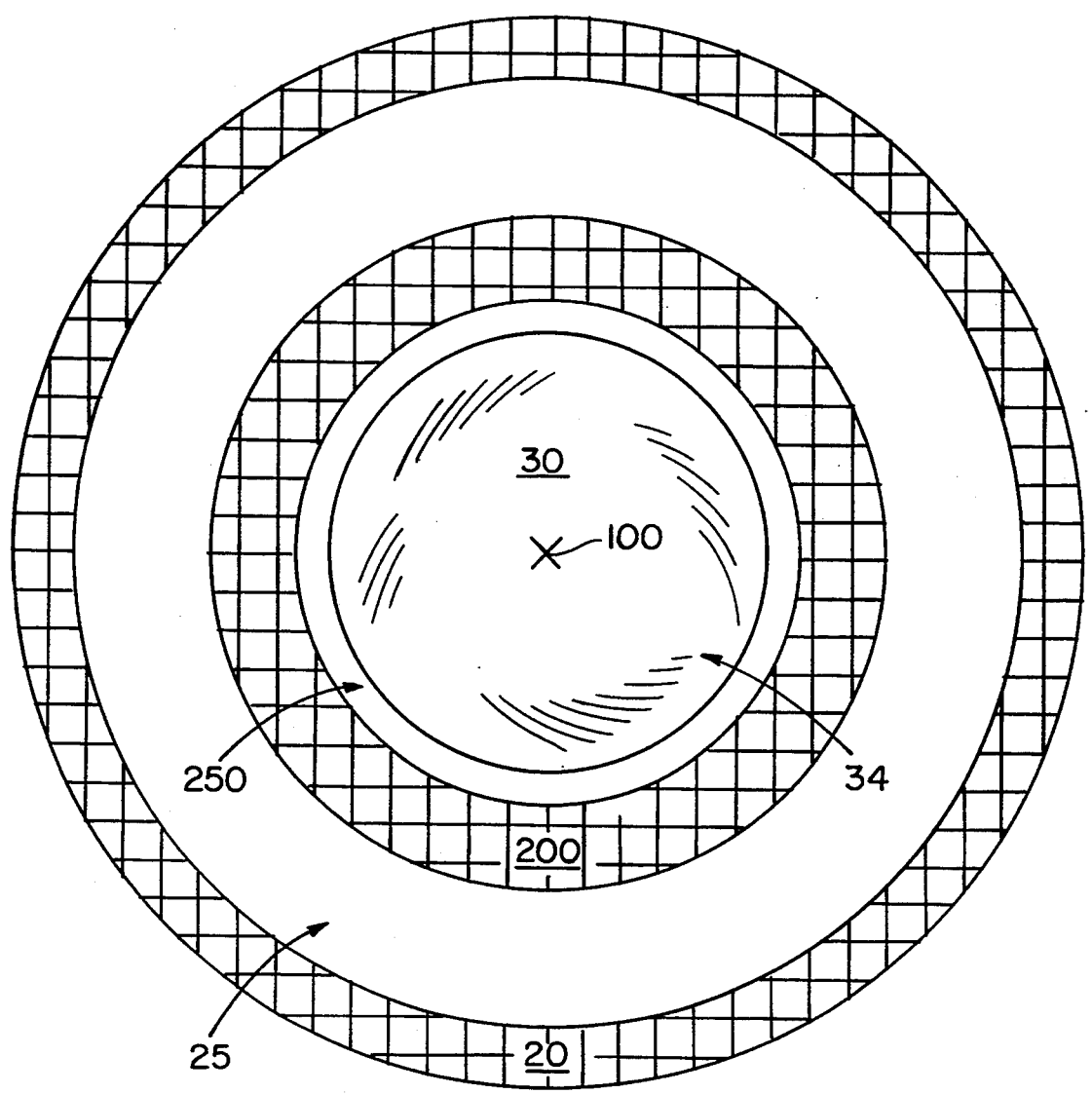
FIG. 6 is a view of a preferred embodiment taken along line II—II of FIG. 5.

FIG. 6 is a view of the preferred embodiment of FIG. 5 taken along line II—II. The outer hindle sphere 20, the inner hindle sphere 200, and the hindle shell 30 are coaxial about the optical axis 100. The inner hindle sphere 200 is positioned within the aperture 25 of the outer hindle sphere 20. The hindle shell 30 is positioned within the aperture 250 of the inner hindle sphere 200.

Figure 7:
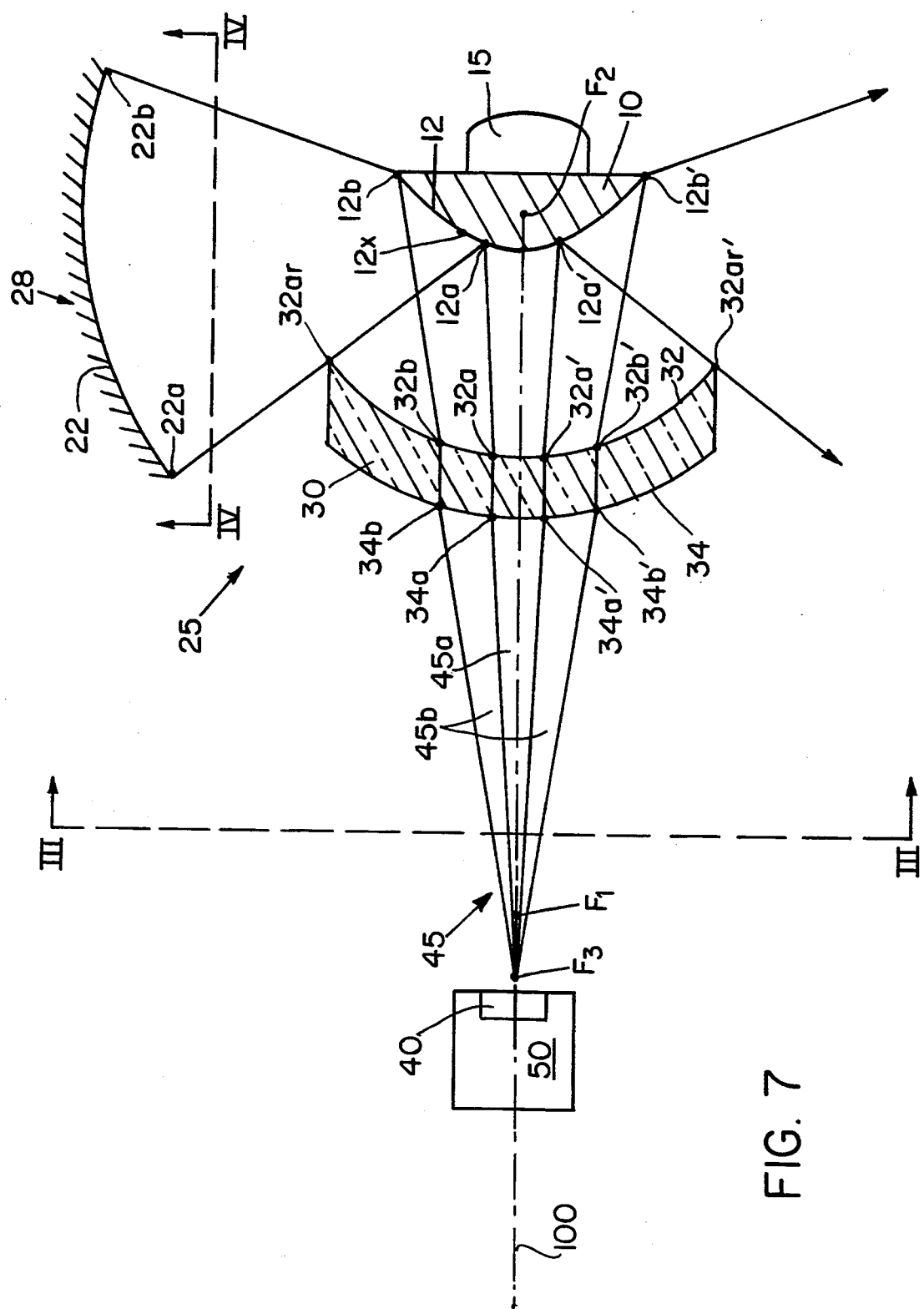
FIG. 7 is a cross-sectional schematic diagram of a preferred embodiment of the invention employing segmented hindle spheres.

FIG. 7 is a cross-sectional schematic diagram of a preferred embodiment of the invention comprising a segmented hindle sphere. The apparatus is similar to that illustrated in FIGS. 3A–3B, except that the hindle sphere 20 is segmented. That is, the hindle sphere 20 is not a complete hindle sphere. Although the inner portion of the mirror surface 12 covered by the inner band of light 45a is tested by the hindle shell 30, only a section of the outer portion of the mirror surface 12 covered by the outer band of light 45b is tested by the segmented hindle sphere 28. The area tested by the segmented hindle sphere 28 corresponds to that segment of the mirror surface 12 extending from the inner test point 12a to the outer test point 12b. Consequently, the segment of the mirror surface 12 extending from the inner test point 12a' to the outer test point 12b' is not tested.

Figure 8B:
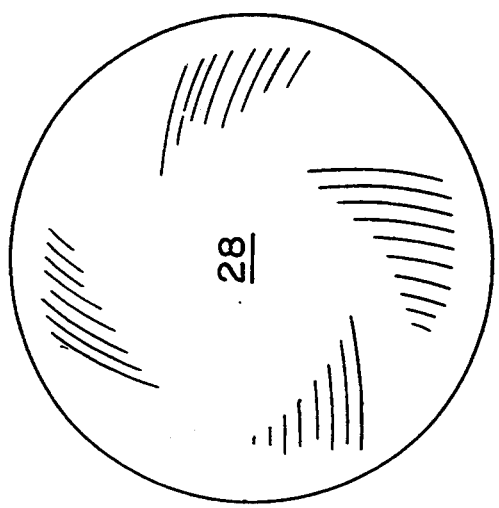
FIG. 8B is a view of a preferred embodiment of the invention taken along line IV—IV of FIG. 7.
Figure 8A:
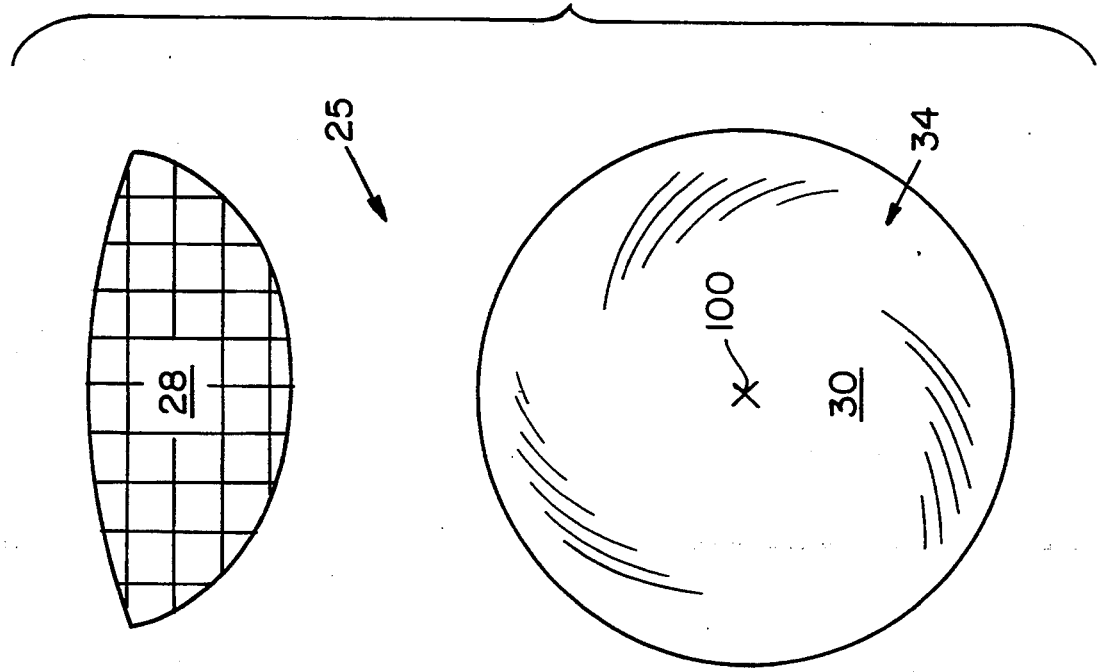
FIG. 8A is a view of a preferred embodiment of the invention taken along line III—III of FIG. 7.

FIG. 8A is a view of the preferred embodiment of FIG. 7 taken along line III—III. FIG. 8B is a view of the preferred embodiment of FIG. 7 taken along line IV—IV. Illustrated is a segmented hindle sphere 28 and a hindle shell 30 positioned coaxially about the optical axis 100. As illustrated more clearly in FIG. 8B, the hindle sphere segment 28 is a relatively small circular section of a hindle sphere 20. The circular section extends to cover one-eighth of the circumference of the outer portion of the mirror surface 12. Consequently, only about one-eighth of the outer portion of the mirror surface 12 can be tested using the segmented hindle sphere 28 as illustrated.

Returning to FIG. 7, a rotator 15 is coupled to the test optic 10 to facilitate testing of the entire outer portion of the mirror surface 12 with a segmented hindle sphere 28. The rotator 15 precisely rotates the test optic 10 about the optical axis 100 in sufficient increments such that the segmented hindle sphere 28 incrementally tests respective segments of the mirror surface 12. For example, a one-eighth segmented hindle sphere 28, as illustrated in FIG. 8A, requires at least eight incremental rotations of the test optic 10 by the rotator 15. The rotator 15 would incrementally rotate the test optic 10 by 45° about the optical axes 100. The amount of the rotation is dependent on the diameter of the segmented hindle sphere 28 and the amount of any overlap desired for each increment.

The above preferred embodiments of the invention illustrate the versatility of the invention. A single hindle shell 30 can test a family of hyperboloids. The gap between the hindle shell 30 and the hyperboloid is adjusted until the optical ray that reflects off the mirror surface 12 strikes the concave surface at normal incidence. The area of the mirror surface 12 not covered by the hindle shell 30 can be tested by positioning a hindle sphere 20 (or an array of hindle spheres) such that the center of curvature $C_2$ coincides with the secondary focus $F_2$. Thus, an available hindle shell 30 can be used without a serious constraint of having to match apertures.

Ideally, the invention provides a null test for a perfect convex hyperboloid mirror surface 12. Aberrations due to defects with the hindle shell 30 or hindle sphere 20 will produce non-null test results. In addition, a slight tilt of the hyperboloid mirror surface 12 relative to the test bodies 20, 28, 30 may be necessary to eliminate any ambiguity possible at the transition zone between the hindle shell area and the hindle sphere area. The tilt can be provided using a translator, which will be described in more detail below. The tilt will produce non-null test results. These non-null test results (coma, astigmatism, and three-point) can be mitigated, for example, by corrective optics or a computer-generated hologram in the interferometer 50.

Figure 9:
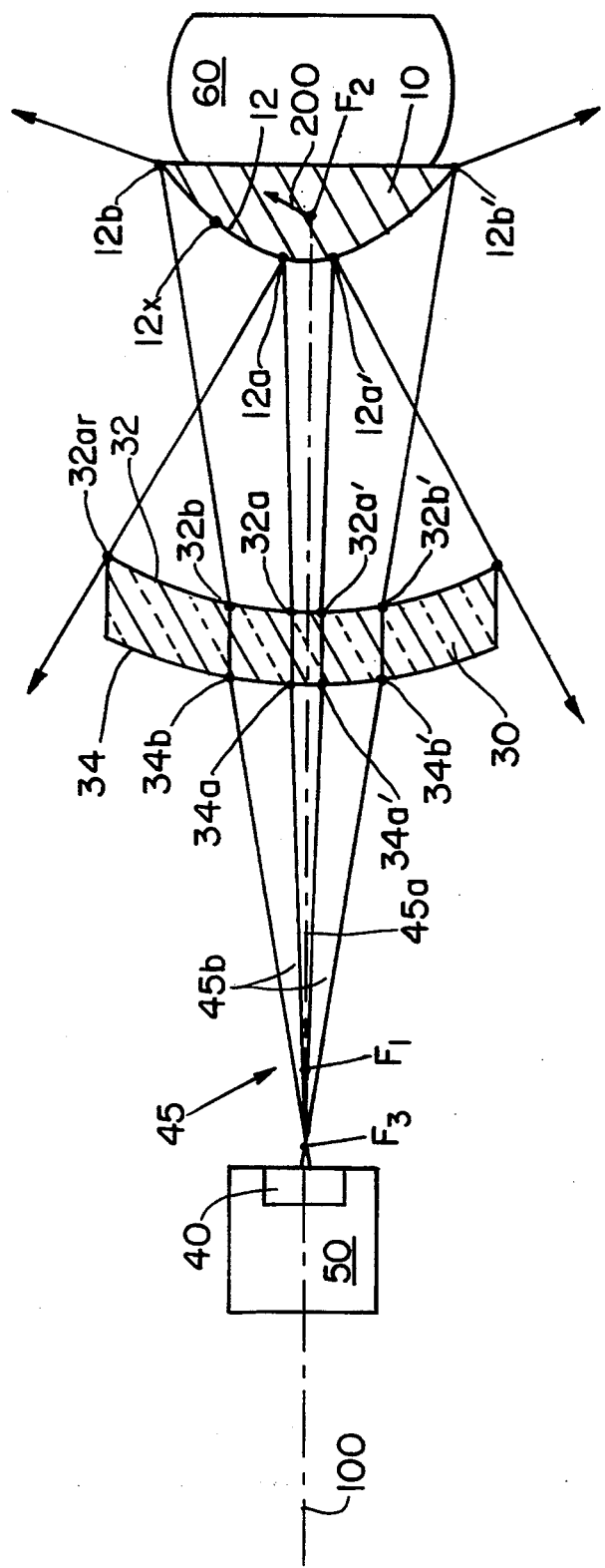
FIG. 9 is a cross-sectional schematic diagram of a preferred embodiment of the invention having a translator.

FIG. 9 is a cross-sectional schematic diagram of another preferred embodiment of the invention. A hindle shell 30 is used to test a portion of the mirror surface 12. The test optic 10 is coupled to a translator 60. The translator 60 translates the test optic 10 relative to the hindle shell 30 about an axis 200 extending through the secondary focus $F_2$ and orthogonal to the optical axis 100. The translator 60 may also rotate the test optic about the optical axis 100. In this embodiment, the hindle shell 30 may be used to test the entire mirror surface 12. The translator 60 can also be incorporated with the rotator 15 to facilitate full coverage of the mirror surface 12 by the segmented hindle sphere 28 of FIG. 7.

Figure 10:
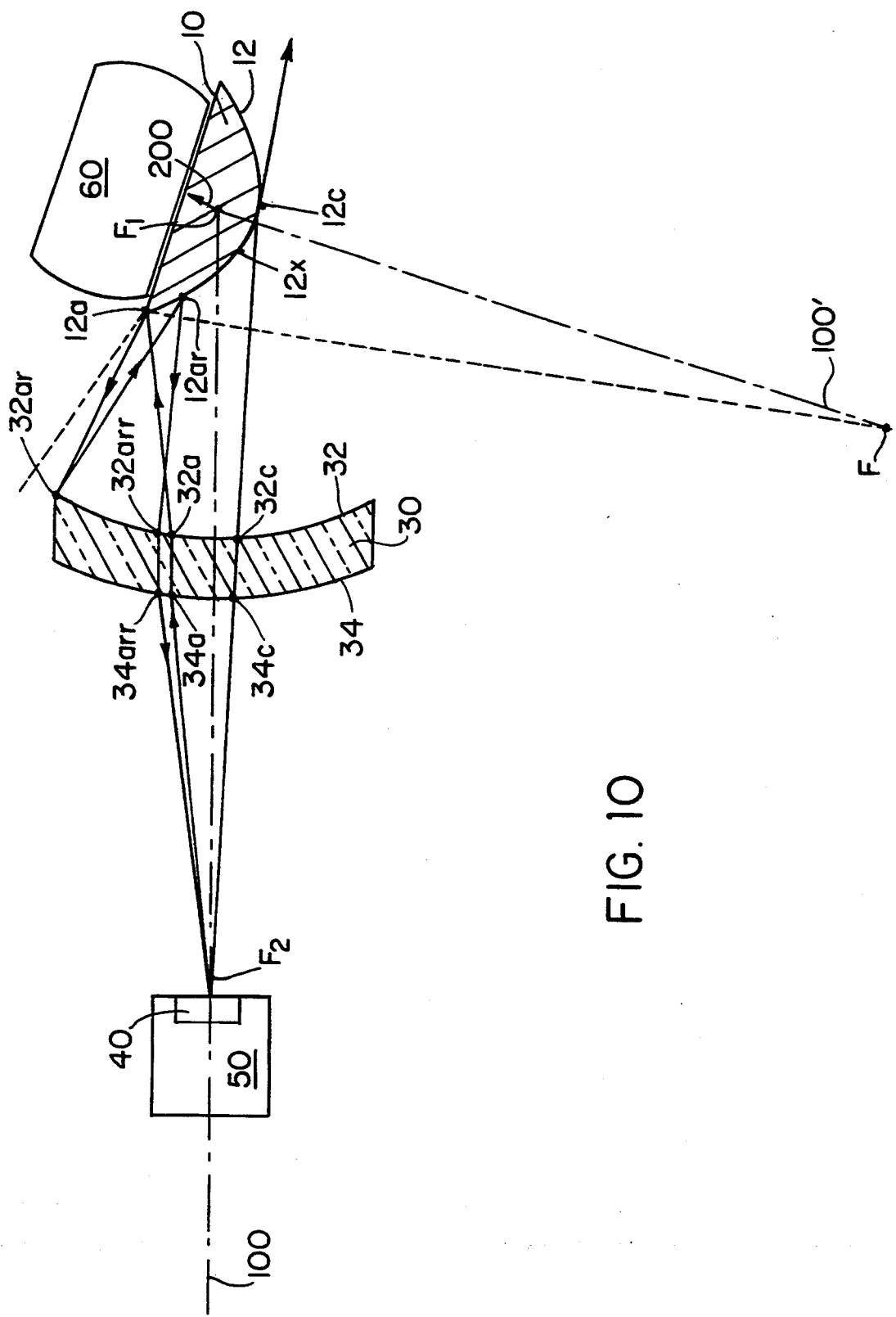
FIG. 10 illustrates a translated mirror surface of FIG. 9.

FIG. 10 illustrates a translated test optic 10 of FIG. 9. The test optic 10 has been rotated about the axis 200. The rotation causes the primary focus $F_1$ and optical axis 100' of the mirror surface 12 to be displaced (or decentered) from the optical axis 100 of the test apparatus. A light ray incident on the outer edge test point 12a of the perfect mirror surface 12 is reflected non-radially to the outer edge 32ar of the hindle shell 30. The light ray is then reflected back to the mirror surface 12, where the light ray becomes incident on a reflected test point 12ar. The mirror surface 12 retroreflects the light ray back to the interferometer 50 through the hindle shell 30 at points 32arr and 34arr.

Because the primary focus $F_1$ is displaced from the optical axis 100, the hindle shell 30 provides a non-null test of the mirror. The resultant interference fringes in the interferometer are not straight and parallel, even for a perfect hyperboloid mirror surface 12. Instead, the fringes must exhibit residual coma and astigmatism. The residual error in an interferogram for a perfect mirror surface 12 is analytically predictable. The residual error can be removed from the interferogram data by analytical subtraction. The residual error can alternatively be compensated in the interferometer by installing a computer-generated hologram in the interferometer. Other conventional corrective optics, such as cylindrical lenses, can be installed in the interferometer to compensate for the astigmatism.

Equivalents

Those skilled in the art will know, or be able to ascertain using no more than routine experimentation, many equivalents to the specific embodiments of the invention described herein.

For example, the preferred embodiments of the invention have been described with reference to convex hyperboloid mirror surfaces. It is recognized that other types of mirror surfaces with suitable test bodies may be substituted without affecting the principles of the invention.

In addition, the invention has been described with reference to the use of hindle spheres and hindle shells. It is recognized that other suitable test bodies may be substituted for the hindle spheres or hindle shells.

These and all other equivalents are intended to be encompassed by the following claims.

The invention claimed is:

1. An apparatus for testing optical surface quality of a test optic having a convex reflective surface with a first local point $F_1$ and a second focal point $F_2$, the apparatus comprising:
   an optical lens having a lens focal point and a lens center of curvature which is coincident with the second focal point $F_2$ of the test optic for testing a first section of the reflective surface of the test optic;
   a light source for generating a wavefront of light originating at the lens focal point and directed toward the lens and wherein the wavefront of the light is centered about an optical axis of the lens extending radially from the lens focal point to the second focal point $F_2$ of the test optic, such that the light incident on the lens from the lens focal point is transmitted through the lens and appears to originate from the first focal point $F_1$ of the test optic before being retroreflected back from the reflective surface of the test optic toward the lens focal point;
   a section of a spherical optical reflector having a reflector center of curvature coincident with the second focal point $F_2$ of the test optic for testing a second section of the reflective surface of the test optic; and
   an interferometer optically positioned at the lens focal point for measuring optical surface quality of the reflective surface of the test optic based on a comparison of the wavefront of the light generated by the light source with the light retroreflected from the reflective surface of the test optic.

2. The apparatus of claim 1 wherein the section of the spherical optical reflector includes an annular aperture coaxial with the optical axis of the lens, a first band of light and a second band of light from the wavefront of light passing through the aperture before becoming incident on the lens, the first band of light for testing a first section of the reflective surface and the second band of light for testing a second section of the reflective surface.

3. The apparatus of claim 2 wherein the section of the spherical optical reflector is a hindle sphere optical reflector and the optical lens is a hindle shell optical lens.

4. An apparatus for testing optical surface quality of a test optic having a convex reflective surface with a first focal point $F_1$ and a second focal point $F_2$, the reflective surface of the test optic having a curvature length measured from the second focal point $F_2$ to the reflected surface and extending a first arc measure $\theta$ with respect to the second focal point $F_2$, the apparatus comprising:
   a first test body having a third focal point $F_3$ for testing a first section of the reflective surface and having a transmissive surface and a concave partially-reflective surface of a known contour extending a second arc measure $\Phi_a$ and a first curvature radius measured from a first center of curvature of the first test body, the first curvature radius being greater than the curvature length of the test optic, the first center of curvature coincident with the second focal point $F_2$;
   a light source for generating a wavefront of light originating at the third focal point $F_3$ and directed toward the first test body, the wavefront of the light is centered about an optical axis extending radially from the third focal point $F_3$ to the second focal point $F_2$, such that the light that is incident on the transmissive surface of the first test body from the third focal point $F_3$ of the first test body are transmitted through the first test body such that the light appears to originate from the first focal point $F_1$ of the test optic before being retroreflected back from the reflective surface of the test optic toward the third focal point $F_3$;
   a second test body for testing a second section of the reflective surface and having a concave reflective surface of a known contour extending a third arc measure $\phi_b$ and a second curvature radius measured from a second center of curvature, and wherein the second test body is positioned such that the second center of curvature is coincident with the second focal point $F_2$ of the test optic and a first band and a second band of the wavefront of light passes through an aperture of a fourth arc measure $\phi_a$, the first band testing the first section of the reflective surface and the second band testing the second section of the reflective surface; and
   an interferometer optically positioned at the third focal point $F_3$ for measuring interference patterns between the light generated by the light source and the light retroreflected from the reflective surface of the test optic, and from the measured interference patterns providing a representation of the optical surface quality of the reflective surface.

5. The apparatus of claim 4 wherein the third arc measure $\phi_b$ is greater than or equal to the first arc measure $\theta$.

6. The apparatus of claim 4 wherein the fourth arc measure $\phi_a$ equals the second arc measure $\Phi_a$.

7. The apparatus of claim 4 wherein the second curvature radius is greater than or equal to the first curvature radius.

8. The apparatus of claim 4 wherein there are a plurality of second test bodies.

9. The apparatus of claim 4 further comprising a rotator to rotate the reflective surface of the test optic about the optical axis relative to the first and second test bodies.

10. The apparatus of claim 4 wherein the first test body is a hindle shell optical lens and the second test body is a hindle sphere optical reflector.

11. The apparatus of claim 4 wherein the second arc measure $\Phi_a$ is less than the first arc measure $\theta$.

12. The apparatus of claim 4 wherein the third focal point $F_3$ is colinear with the first focal point $F_1$ and the second focal point $F_2$.

13. A method for testing optical surface quality of a test optic having a convex reflective surface, with a first focal point $F_1$ and a second focal point $F_2$, comprising the steps of:
   a) directing an expanding wavefront of light rays from a light source toward the reflective surface of the test optic to reflect the light rays from the reflective surface;
   b) transmitting at least a test portion of the expanding wavefront of light rays through a first test body disposed between the test optic and the light source such that the test portion of light rays is incident on at least a segment of the reflective surface of the test optic extending from the optical center of the test optic toward the peripheral edge of the reflective surface of the test optic;

c) reflecting the test portion of the light rays from the test optic, each light ray being reflected either radially or non-radially from the test optic;

d) receiving a first test band of the test portion of the reflected light rays at the first test body;

e) reflecting the light rays of the first test band that were radially reflected from the test optic from the first test body, each light ray being reflected along a respective reverse optical path toward the test optic and reflecting at least a portion of the light rays of the first test band that were non-radially reflected from the test optic from the first test body toward the test optic;

f) receiving a second test band of the test portion of the reflected light rays at a second test body;

g) reflecting the light rays of the second test band that were radially reflected from the test optic from the second test body, each light ray being reflected along a respective reverse optical path toward the test optic and reflecting at least a portion of the light rays of the second test band that were reflected non-radially from the test optic from the second test body toward the test optic;

h) retroreflecting the light rays reflected along the respective reverse optical paths from the reflective surface of the test optic toward the first test body;

i) transmitting the retroreflected light rays through the first test body; and j) analyzing the transmitted retroreflected light rays to determine the optical surface quality of the reflective surface.

14. The method of claim 13 wherein the step of altering the direction of a test portion of the wavefront of light comprises refracting light rays such that the light rays appear to originate from the first focal point $F_1$.

15. The method of claim 13 wherein the step of altering the direction of the retroreflected light rays comprises refracting light rays.

16. The method of claim 13 wherein the step of altering the direction of the retroreflected light rays comprises focusing the light rays on a third focal point $F_3$ of the first test body.

17. The method of claim 13 wherein the step of analyzing comprises measuring interference patterns between light generated by the light source and light retroreflected from the reflective surface of the test optic.

18. The method of claim 13 further comprising the step of rotating the mirror surface relative to the first and second test bodies about an optical axis extending radially from the reflective surface of the test optic through a third focal point $F_3$ of the first test body.

19. A method for testing optical surface quality of a test optic having a convex hyperboloid reflective surface with a first conjugate focal point $F_1$, the reflective surface defining a concave backside with a second conjugate focal point $F_2$, comprising the steps of:

a) directing an expanding wavefront of light rays from a light source toward the reflective surface of the test optic to reflect the light rays from the reflection surface;

b) transmitting at least a test portion of the expanding wavefront of light rays through a test body disposed between the test optic and the light source such that the test portion of light rays is incident on at least a segment of the reflective surface of the test optic extending from the optical center of the reflective surface of the test optic toward the outer edge of the reflective surface of the test optic;

c) reflecting the test portion of the light rays from the test optic, each light ray being reflected either radially or non-radially from the test optic;

d) receiving a test band of the reflected light rays at the test body;

e) reflecting a the light rays of the test band that were radially reflected from the test optic from the test body, each light ray being reflected along a respective reverse optical path toward the test optic and reflecting the light rays of the test band that were non-radially reflected from the test optic from the test body toward the test optic;

f) retroreflecting the light rays reflected by the test body from the reflective surface of the test optic toward the test body;

g) translating the reflective surface of the test optic relative to the test body to produce non-null test results in the retroreflected light rays, the translation being about an axis that extends through the second conjugate focal point $F_2$ and that is orthogonal to an optical axis, which extends radially from the reflective surface of the test optic through the position of the light source;

h) transmitting the retroreflected light rays through the test body; and i) analyzing the transmitted retroreflected light rays to determine optical surface quality of the reflective surface.

20. The method of claim 19 wherein the step of altering a test portion of the wavefront of the light rays comprises refracting the light rays such that the light rays appear to originate from the first conjugate focal point $F_1$.

21. The method of claim 19 wherein the step of altering the retroreflected light rays comprises refracting the light rays.

22. The method of claim 21 wherein the step of altering the retroreflected light rays further comprises optically correcting the non-null test results.

23. The method of claim 21 wherein the step of altering the retroreflected light rays further comprises focusing the light rays on a test body focal point $F_3$ of the test body.

24. The method of claim 19 wherein the step of analyzing comprises measuring interference patterns between the light generated by the light source and the light retroreflected from the reflective surface.

25. The method of claim 24 wherein the step of analyzing further comprises instructing an interferometer to correct for non-null test results.

26. An apparatus for testing optical surface quality of a test optic having a convex hyperboloid reflective surface with a primary conjugate focal point $F_1$ and a secondary conjugate focal point $F_2$ and a focal length measured from the secondary conjugate focal point to the reflective surface, the reflective surface extending a first arc measure $\theta$ with respect to the secondary conjugate focal point $F_2$, the apparatus comprising:

a hindle shell optical lens having a lens focal point $F_3$ and a first radius of curvature as measured from a first center of curvature that is greater than the focal length of the reflective surface and having a second arc measure $\Phi_a$ relative to the secondary conjugate focal point $F_2$ that extends less than the first arc measure $\theta$ to test for aberrations of a center portion of the reflective surface, wherein the hindle shell is positioned such that the first center of curvature is coincident with the secondary conjugate focal point $F_2$, and the lens focal point $F_3$ is colinear with the primary conjugate focal point $F_1$ and secondary conjugate focal point $F_2$;

a light source to generate an expanding wavefront of light originating from the lens focal point $F_3$, the wavefront of light directed toward the hindle shell and coaxial about an optical axis extending radially from the lens focal point $F_3$ to the secondary conjugate focal point $F_2$, and such that the light incident on the hindle shell is transmitted through the hindle shell before being retroreflected back from the convex hyperboloid surface to the lens focal point $F_3$;

a hindle sphere reflector having a second radius of curvature as measured from a second center of curvature that is greater than the focal length of the reflective surface and extending a third arc measure $\phi_b$ relative to the secondary conjugate focal point $F_2$ to test for aberrations of an outer portion of the reflective surface, the hindle sphere positioned such that the second center of curvature is coincident with the secondary conjugate focal point $F_2$ and a first band of the light and a second band of the light passes through an aperture of a fourth arc measure $\phi_a$ centered about the optical axis, the first band of light for testing the center portion of the reflective surface and the second band of light for testing the outer portion of the reflective surface; and an interferometer positioned at the lens focal point $F_3$ for measuring interference patterns between light generated by the light source and light retroreflected from the convex hyperboloid surface, the measured interference patterns providing a representation of optical surface quality of the reflective surface.

27. The apparatus of claim 26 wherein the third arc measure $\phi_b$ is greater than or equal to the first arc measure $\theta$.

28. The apparatus of claim 26 wherein the fourth arc measure $\phi_a$ equals the second arc measure $\Phi_a$.

29. The apparatus of claim 26 wherein the second radius of curvature is greater than or equal to the first radius of curvature.

30. The apparatus of claim 26 wherein there are a plurality of hindle spheres.

31. The apparatus of claim 26 further comprising a rotator to rotate the reflective surface of the test optic about the optical axis relative to the hindle shell and the hindle sphere.

* * * * *